(12) United States Patent
Volz

(10) Patent No.: US 7,418,781 B2
(45) Date of Patent: Sep. 2, 2008

(54) METHOD FOR PRODUCTION OF A THROTTLE VALVE IN A CONTINUOUS THROTTLE VALVE CONNECTOR

(75) Inventor: Peter Volz, Bad Soden (DE)

(73) Assignee: Siemens Aktiengesellschaft, Munich (DE)

( * ) Notice: Subject to any disclaimer, the term of this patent is extended or adjusted under 35 U.S.C. 154(b) by 45 days.

(21) Appl. No.: 11/100,586

(22) Filed: Apr. 7, 2005

(65) Prior Publication Data

US 2005/0198823 A1   Sep. 15, 2005

Related U.S. Application Data

(63) Continuation of application No. PCT/DE03/03004, filed on Sep. 10, 2003.

(51) Int. Cl.
*B21K 1/24* (2006.01)
*B21K 1/22* (2006.01)

(52) U.S. Cl. ............... 29/888.44; 29/888.45; 29/888.4; 29/890.127; 29/890.128; 264/279

(58) Field of Classification Search ............... 29/884.4, 29/884.44, 884.45, 890.12, 890.122, 890.127, 29/890.128, 888.4, 888.44, 888.45; 264/250, 264/255, 264, 273, 279; 123/337; 251/306
See application file for complete search history.

(56) References Cited

U.S. PATENT DOCUMENTS 6,837,261 B2   1/2005   Rentschler et al.

FOREIGN PATENT DOCUMENTS

| DE | 43 43 091 A1 | 6/1995 |
|---|---|---|
| DE | 195 12 729 A1 | 10/1996 |
| DE | 199 18 777 A1 | 10/2000 |
| DE | 101 04 747 A1 | 8/2002 |
| FR | 2 687 601 A1 | 8/1993 |
| JP | 11294203 | 1/1999 |
| JP | 11229909 | 8/1999 |
| JP | 2001263098 | 9/2001 |
| WO | WO 97/04259 | 2/1997 |

OTHER PUBLICATIONS

Derwent Abstract—DE-195 12 729 A1;Oct. 10, 1996; VDO Adolf Schindling AG, D-60326 Frankfurt (Germany).

Derwent Abstract—DE-101 04 747 A1; Aug. 8, 2002; Siemens AG, D-80333 München (Germany).

(Continued)

*Primary Examiner*—David P. Bryant
*Assistant Examiner*—Sarang Afzali
(74) *Attorney, Agent, or Firm*—Bell, Boyd & Lloyd LLP

(57) ABSTRACT

A peripheral, annular groove is incorporated into a throttle valve connector in one step. A first die and a second die are then inserted into the throttle valve connector and a first plastic material is introduced into a first cylindrical cavity formed thereby in a molten state and hardened, resulting in a plastic insert. The first die and the second die are subsequently removed from the throttle valve connector and a third die and a fourth die are inserted into the throttle valve connector. A second cavity is formed therebetween and filled with a second plastic material, whereby a throttle valve is formed and is fixed during the cooling process by shrinkage on the throttle valve shaft.

7 Claims, 5 Drawing Sheets

OTHER PUBLICATIONS

Derwent Abstract—DE-43 43 091 A1; Jun. 22, 1995; Robert Bosch GmbH, D-70469 Stuttgart (Germany).

Derwent Abstract—DE-199 18 777 A1; Oct. 26, 2000; Filterwerk Mann + Hummel GmbH, D-71638 Ludwigsburg (Germany).

Abstract—FR-2 687 601 A1; Aug. 27, 1993; Compagnie Plastic Omnium CIE (France).

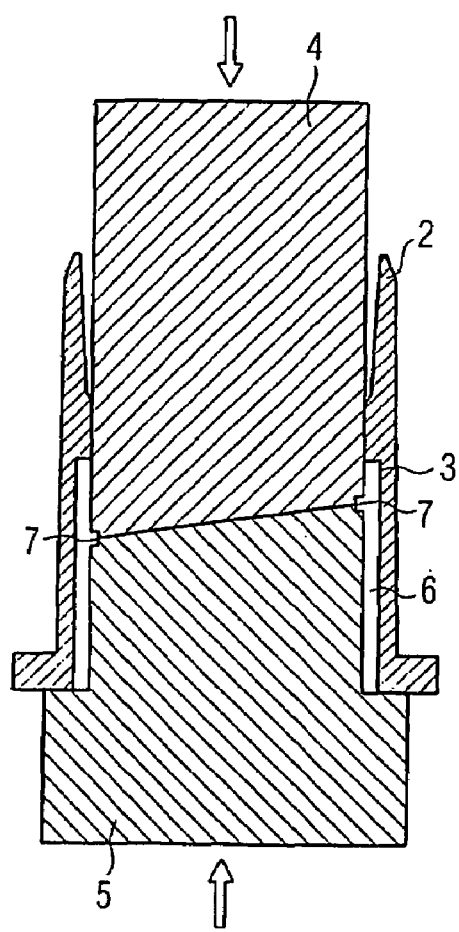
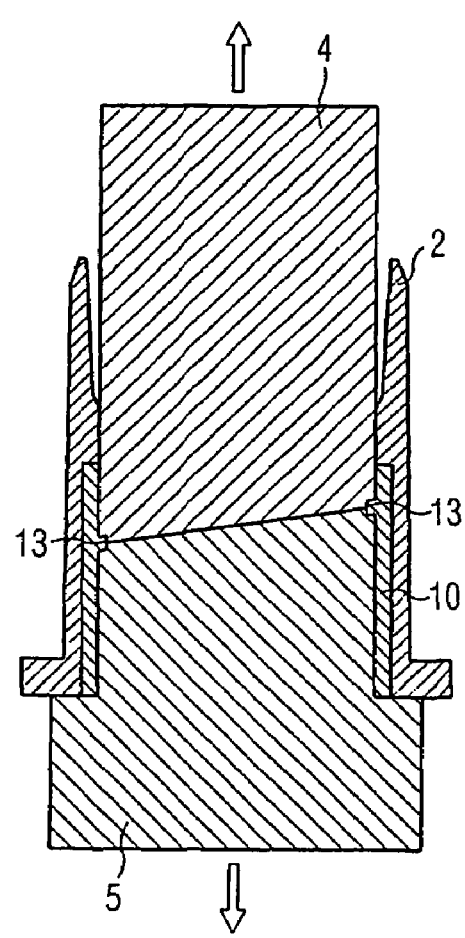

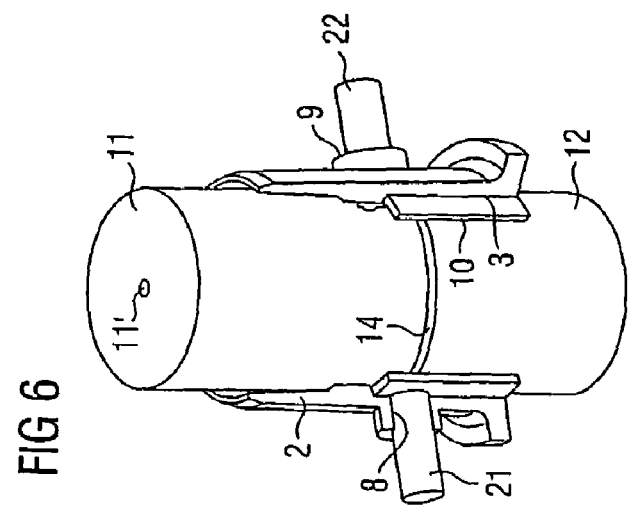
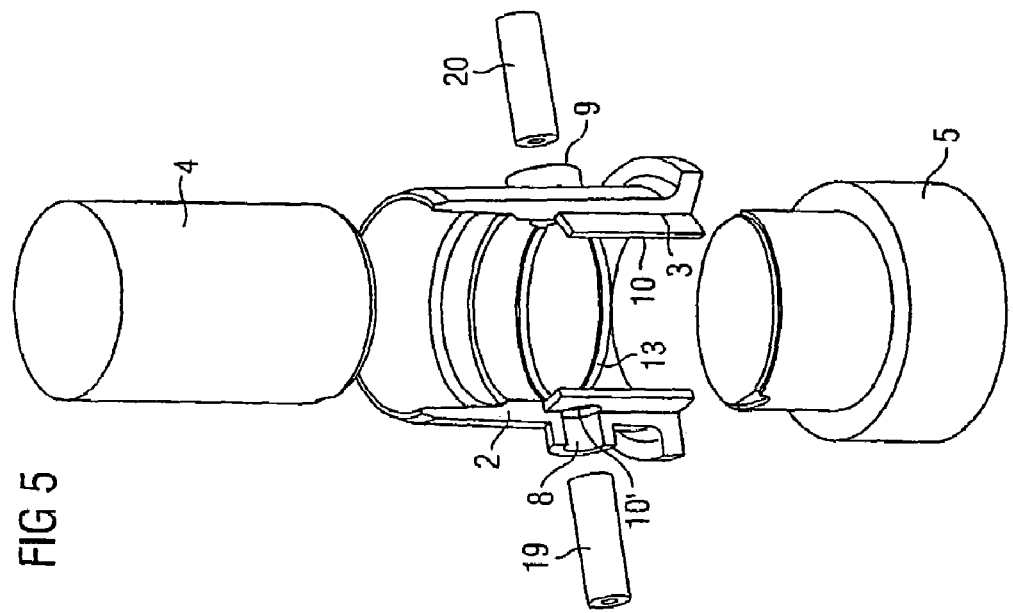

Section A-A

METHOD FOR PRODUCTION OF A THROTTLE VALVE IN A CONTINUOUS THROTTLE VALVE CONNECTOR

CROSS REFERENCE TO RELATED APPLICATIONS

The present application is a continuation of International Application Serial Number PCT/DE2003/003004, filed 10 Sep. 2003 (10.09.2003), which designated the United States and further claims priority to German patent application 102 46 726.9, filed 7 Oct. 2002 (07.10.2002), the both of which are herein incorporated by reference.

BACKGROUND OF THE INVENTION

Throttle valves in throttle valve connectors are known. In DE 195 12 729 A1, a throttle valve connector having a tubular housing is described, in which a throttle valve is fastened to a throttle valve shaft, which is mounted at its free ends such that it can be rotated transversely with respect to the longitudinal axis of the tubular housing, leading through cutouts in the housing wall. When arranging throttle valves in throttle valve connectors, it is often disadvantageous that, on account of to some extent extremely small leakage stipulations, it is necessary to operate with high precision and surface quality. In this case, casting material, of which the throttle valve connector is composed, and the casting quality have a high quality standard. The throttle valve in this case is generally punched out of a metal sheet and turned extremely finely with great effort in terms of precision, very close tolerances having to be maintained.

A method according to the preamble of claim 1 is disclosed by FR 2 687 601 A1. There, in the region of the shaft aperture, a critical transition region between throttle valve and throttle valve connector results.

JP 11 229909 A discloses a throttle valve connector having a peripheral projection, while DE 199 18 777 A1 indicates the injection molding of a shaft having valve wings for a control valve unit.

The invention is based on the object of providing a method for production of a throttle valve in a continuous throttle valve connector in which it is possible to dispense with a turning operation in the close tolerance range.

The object on which the invention is based is achieved by a method for production of a throttle valve in a continuous throttle valve connector. First of all, use is made of a throttle valve connector of a first plastic which, on the inside, has a peripheral projection running toward the center of the throttle valve connector. Then, via the apertures, a throttle valve shaft is introduced through the throttle valve connector and the plastic insert, at right angles to the longitudinal axis of the throttle valve connector, is mounted in the apertures in each case by a first hollow plug and a second hollow plug, with which the apertures in the throttle valve connector are closed in a manner complementary to the plastic insert and, from both sides, a first die and a second die are introduced into the throttle valve connector which, between the two of them and the peripheral projection of the plastic insert that is formed and runs toward the center of the throttle valve connector, form a second cavity which surrounds the throttle valve shaft in the form of the throttle valve; then, in a further step, a molten second plastic is put into the second cavity through the first die and is cured there, forming the throttle valve; then, in a still further step, the first die and the second die are removed from the throttle valve connector. The first plastic is put into the first cavity through at least one aperture.

This means that in every case there are two apertures but only one aperture has to serve as a feed line for the first plastic. However, it is also possible to put the first plastic into the first cavity through both apertures. During the curing of the second plastic, the throttle valve is necessarily connected to the throttle valve shaft. This takes place as a result of shrinkage of the second plastic during the cooling phase. The throttle valve shaft is in each case mounted in the apertures by a first hollow plug and a second hollow plug which, for example, are configured in the form of tubular pieces sealed off on one side. They generally consist of steel.

A preferred development of the method provides that, in a first step, a peripheral, annular groove is machined in the throttle valve connector; then, in a second step, a third die and a fourth die are introduced into the throttle valve connector from both sides, being configured so as to be complementary to each other and, when introduced, forming in the region of the annular groove a cylindrical first cavity which, toward the center of the throttle valve connector, has a peripheral projection; then, in a third step, a molten first plastic is put into the first cavity laterally through at least one aperture in the throttle valve connector and is cured there, forming a plastic insert; then, in a fourth step, the third die and the fourth die are removed from the throttle valve connector. The throttle valve connector can consist, for example, of die cast aluminum. The peripheral, annular groove machined into the throttle valve connector can be bounded on one side or two sides, parallel to the longitudinal axis of the throttle valve connector. The first die, the second die, the third and fourth die consist of steel.

The third die and the fourth die are configured so as to be complementary to each other. This means that they interact functionally and jointly form the cylindrical cavity, the peripheral projection of this cylindrical cavity being formed by their end faces which make contact when introduced, by removal of material there. This peripheral projection can be annular.

The first plastic differs from the second plastic by its shrinkage capacity during the cooling phase. This achieves a situation where a slight gap is formed between the throttle valve produced and the plastic insert, so that the throttle valve cannot be joined to the plastic insert. In the fourth step, the apertures of the throttle valve connector are closed so as to be complementary to the plastic insert. This is carried out by means of the introduction of the first hollow plug and of the second hollow plug into the apertures. As a result, delimitation of the peripheral projection of the plastic insert running toward the center of the throttle valve connector is achieved, said insert no longer being present at the location of the apertures. The second plastic is normally put into the throttle valve connector via a hole running centrally through the first die.

It has surprisingly transpired that, in the method for production of a throttle valve in a continuous throttle valve connector, no kind of turning operations are necessary in which the setting of small tolerances is carried out. The technical interplay between throttle valve and plastic insert in the throttle valve connector is implemented solely by the two injection molding operations in the continuous throttle valve connector, so that complicated remachining steps can be dispensed with.

A preferred refinement of the invention consists in the peripheral projection of the plastic insert not being formed continuously at the same spacing from the edges of the plastic insert, and the maximum angle $\alpha$ between the perpendicular to the longitudinal axis of the throttle valve connector and the direct connection between two directly mutually opposite regions of the peripheral projection lying between 7° and 8°.

In this way, the generally desired oblique position of the throttle valve in the continuous throttle valve connector is achieved in a straightforward manner. The end faces of the first die and of the second die are in this case designed to run obliquely in a complementary manner.

According to a further preferred refinement of the invention, the first plastic and the second plastic used are polyphenyl sulfide (PPS) with different linear coefficients of expansion. This polyphenyl sulfide is particularly suitable for production of the throttle valve on account of its shrinkage behavior.

According to a further refinement of the invention, provision is made for the first plastic used to be a polyphenyl sulfide (PPS) with a linear coefficient of expansion between 90 and 250° C. of $36 \cdot 10^{-6}$ and the second plastic used to be a polyphenyl sulfide (PPS) with a linear coefficient of expansion between 90 and 250° C. of $46 \cdot 10^{-6}$. These two types of plastic are particularly advantageously suitable for the intended use.

A further preferred refinement of the invention consists in a throttle valve shaft being introduced which has a tapered cross section in the region of the throttle valve. In this case, the taper advantageously corresponds to the thickness of the second plastic on the throttle valve shaft, so that the latter terminates flush with the actual diameter of the throttle valve shaft. As a result, a larger projection of the throttle valve shaft beyond the actual diameter of the throttle valve shaft is advantageously avoided. Furthermore, it is ensured that the arrangement of the throttle valve on the throttle valve shaft is associated with only a relatively low space requirement.

According to a further preferred refinement of the invention, a throttle valve shaft is introduced which, in the region of the throttle valve, has machined portions for the form-fitting fixing of the second plastic. These machined portions can be, for example, roughened portions, protrusions, external threads or grooves, into which the second plastic is introduced and is cured there. By means of this form-fitting fixing, the joint between the throttle valve and the throttle valve shaft is reinforced.

According to a further refinement of the invention, the machined portions provided are holes. In this case, it is particularly advantageous to provide two continuous holes arranged beside each other on the throttle valve shaft, into which the molten second plastic penetrates during the injection molding and can likewise cure there, which noticeably improves the stability of the joint between the throttle valve and the throttle valve shaft.

BRIEF DESCRIPTION OF THE SEVERAL VIEWS OF THE DRAWINGS

The invention will be explained in more detail by way of example by using the drawings listed below.

FIG. 1 shows the throttle valve connector with the cylindrical cavity formed in cross section.

FIG. 2 shows the throttle valve connector with the plastic insert formed in cross section.

FIG. 5 shows an exploded illustration according to FIG. 4.

FIG. 6 shows a three-dimensional illustration of the third and of the fourth die when introduced into the throttle valve connector.

DETAILED DESCRIPTION OF THE INVENTION

Figure 3:
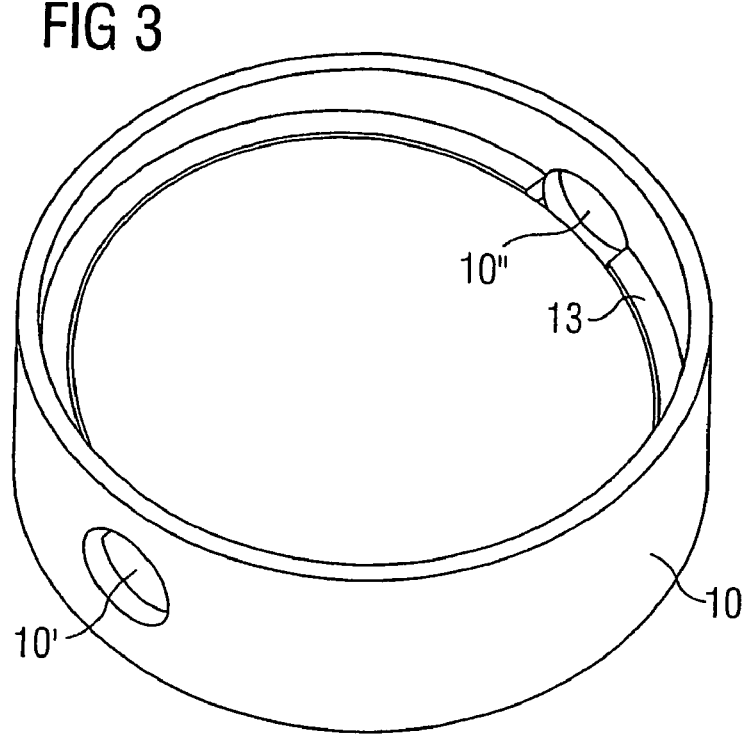
FIG. 3 shows the three-dimensional illustration of a plastic insert together with the throttle valve.

In FIG. 1, the throttle valve connector 2, the third die 4 and the fourth die 5, which have already been introduced completely into the throttle valve connector 2 in the direction of the arrow, are shown in cross section. FIG. 1 thus shows the second step of the method. The third die 4 and the fourth die 5 are configured so as to be complementary. This means that their end faces rest and fit on each other when they are introduced. The throttle valve connector 2 has a peripheral, annular groove 3, which is bounded on one side by the throttle valve connector 2, parallel to the longitudinal axis of the throttle valve connector 2. In the region of the annular groove 3, the third die 4 and the fourth die 5 form a cylindrical first cavity 6, into which, in the following third step, a molten first plastic is put laterally through at least one aperture (not illustrated) of the throttle valve connector 2. This plastic then completely fills the cylindrical first cavity 6, which has a peripheral projection 7 toward the center of the throttle valve connector 2.

FIG. 2 shows the throttle valve connector 2 with the third die 4 and the fourth die 5 in cross section. Here, FIG. 2 shows the third step of the method. The first plastic has already been put into the first cavity (not illustrated) and cured there, a plastic insert 10 being formed. Following its curing, the third die 4 and the fourth die 5 are removed from the throttle valve connector 2 in the direction of the arrow. The plastic insert 10 then remains in the throttle valve connector 2 and has a peripheral projection 13 running toward the center of the throttle valve connector 2.

FIG. 3 shows a plastic insert 10 having the peripheral projection 13 together with the throttle valve 1 in simplified form. The plastic insert 10 has a first opening 10' and a second opening 10" which, before the second injection molding operation for forming the throttle valve (not illustrated) are closed so as to be complementary to the plastic insert. This means that, at the locations of the first opening 10' and of the second opening 10", the projection 13 which is not present there is supplemented by the first hollow plug and the second hollow plug (not illustrated).

Figure 4:
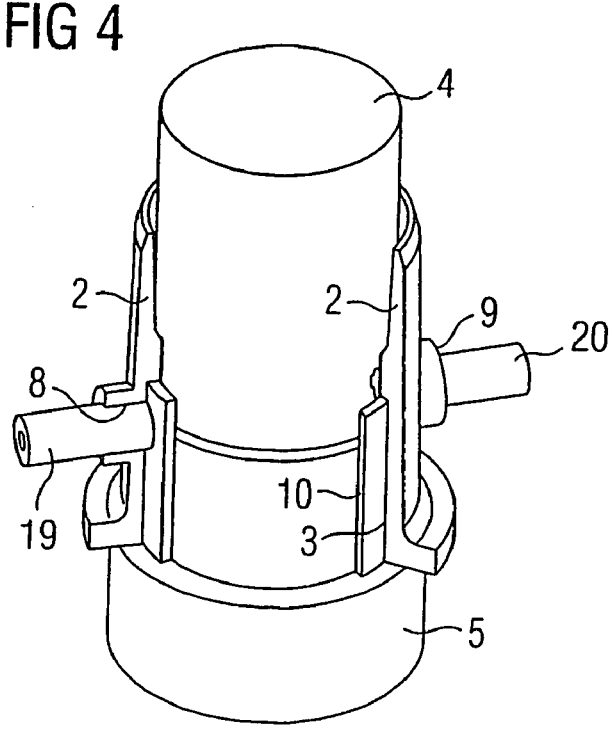
FIG. 4 shows the three-dimensional illustration of the first die and of the second die when they have been almost introduced into the throttle valve connector.

In FIG. 4, the third die 4 and the fourth die 5 in the throttle valve connector 2 are illustrated three-dimensionally in the almost introduced state. The throttle valve connector 2 has two apertures 8, 9, through which a first feed 19 and a second feed 20 for the first plastic are introduced. They are used at the same time for venting the cylindrical first cavity 6 (not illustrated) during the first injection molding operation. After the third die 4 and the fourth die 5 have been introduced into the throttle valve connector 2, the first plastic is introduced via the first feed 19 or via the second feed 20 in order to form the plastic insert 10. Following curing of the plastic insert 10, the third die 4 and the fourth die 5 are removed from the throttle valve connector 2 again.

FIG. 5 shows an exploded illustration according to FIG. 4. Here, only the peripheral projection 13 of the plastic insert 10 running continuously has been illustrated.

In FIG. 6, the throttle valve connector 2 together with the first die 11 and the second die 12 are illustrated three-dimensionally in the introduced state. The first feed and the second feed for the first plastic (not illustrated) have in the meantime been withdrawn from the device and have been replaced by a first hollow plug 21 and a second hollow plug 22, which close the apertures 8, 9 of the throttle valve connector 2 so as to be complementary to the plastic insert 10. The throttle valve shaft (not illustrated) is arranged between them. Between the first die 11 and the second die 12 and the peripheral projection of the plastic insert 10 (not illustrated) formed and running toward the center of the throttle valve connector 2, a second cavity 14 surrounding the throttle valve shaft 15 in the form of the throttle valve (not illustrated) is formed. Then, in the fifth step, a molten second plastic is put into the second cavity 14 through the first die 11 and is cured there to form the throttle valve 1. In this case, the second plastic is put into the interior of the throttle valve connector 2 through a continuous hole 11' arranged centrally in the first die 11. Following curing of the throttle valve (not illustrated), the first die 11 and the second die 12 are withdrawn from the throttle valve connector 2 again.

Figure 7:
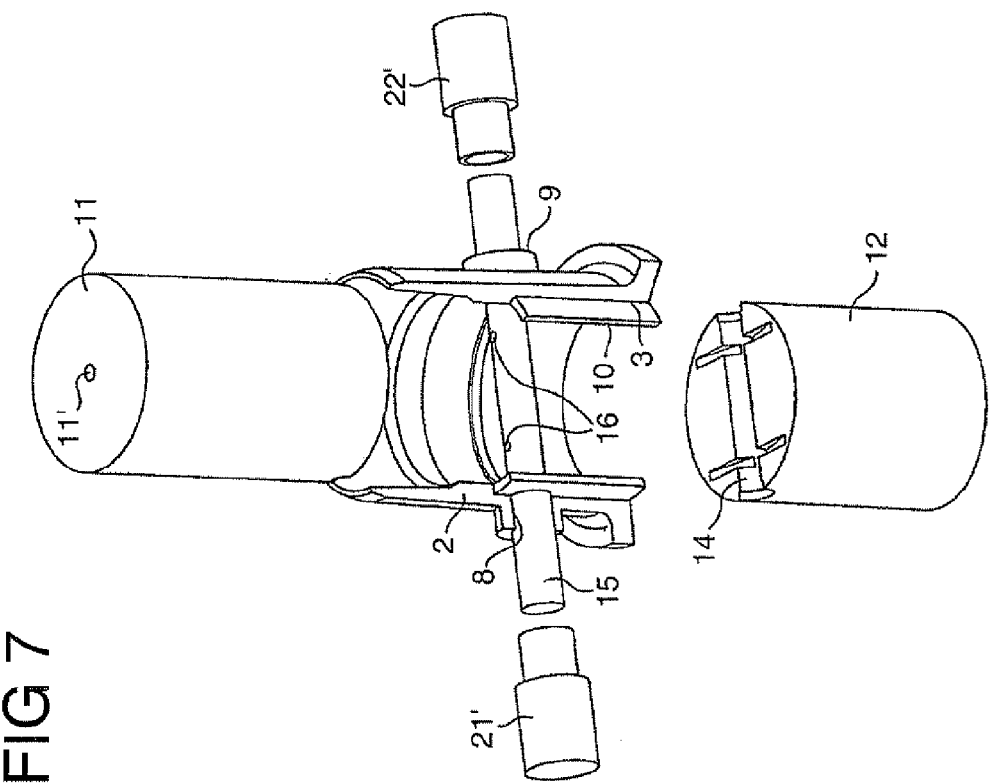
FIG. 7 shows an exploded illustration of the arrangement according to FIG. 6 with the throttle valve shaft and hollow plugs according to another embodiment.

FIG. 7 shows an exploded drawing according to FIG. 6; however, with structurally different hollow plugs. The throttle valve shaft 15, which has a tapered cross section in the region of the throttle valve (not illustrated), has been led through the apertures 8, 9. In this region, machined portions are arranged for the form-fitting fixing of the second plastic, in the form of holes 16. The throttle valve shaft 15 is mounted in the apertures 8, 9 in each case by means of a first hollow plug 21' and by means of a second hollow plug 22', with which the apertures 8, 9 in the throttle valve connector 2 are closed so as to be complementary to the plastic insert.

Figure 8:
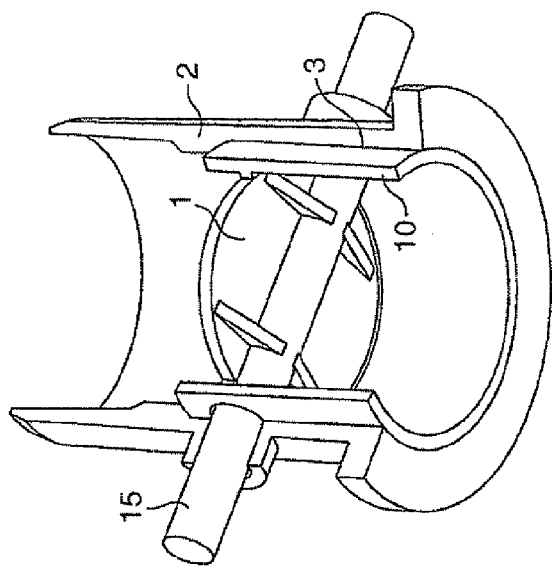
FIG. 8 shows the three-dimensional illustration of the throttle valve connector together with the throttle valve fixed on the throttle valve shaft.

In FIG. 8, the throttle valve connector 2 is illustrated three-dimensionally with a view of the throttle valve 1. The throttle valve 1 is already on the throttle valve shaft 15.

Figure 9A:
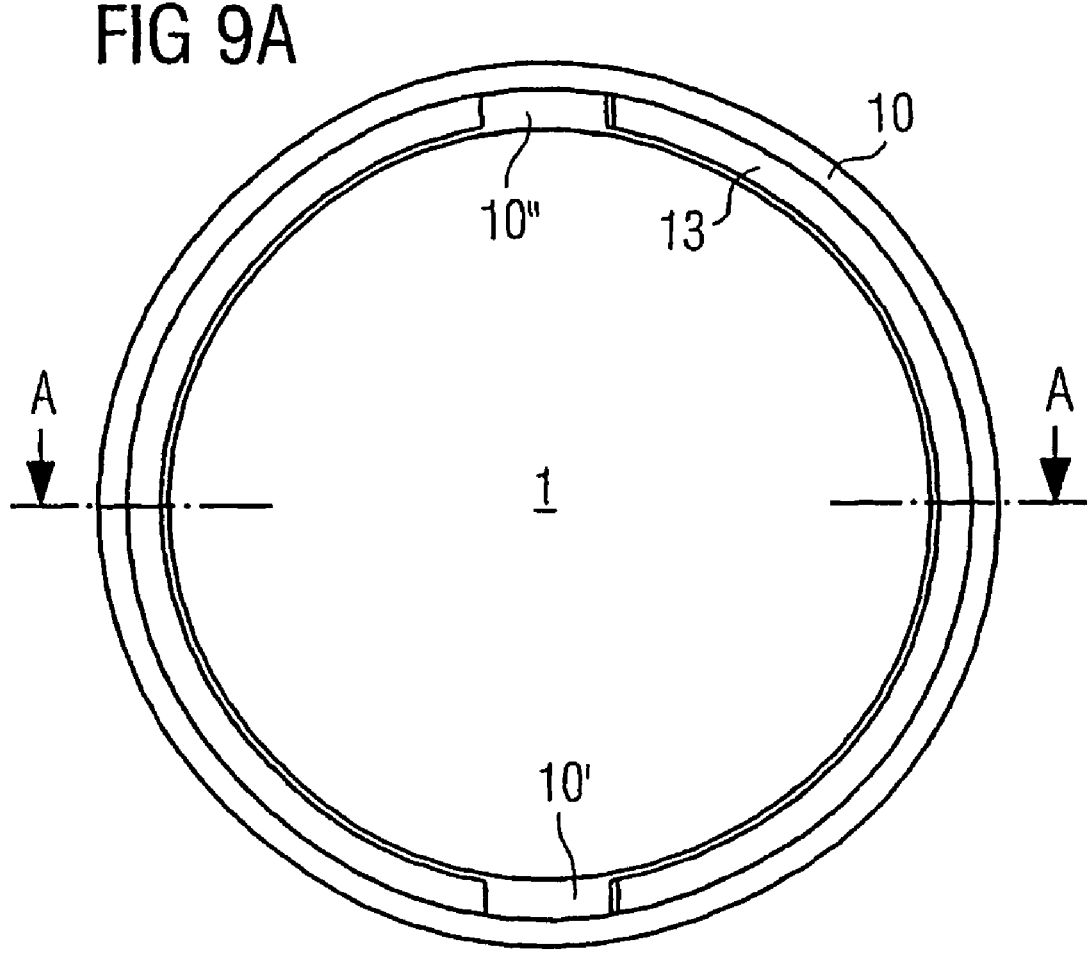
FIGS. 9a), b) shows the plan view of the plastic insert and the plastic insert in cross section according to section A-A.
Figure 9B:
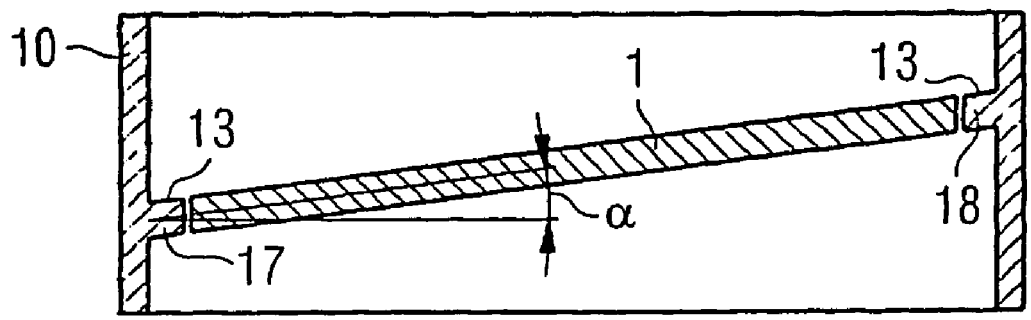

FIGS. 9a), b) illustrate the plan view of the plastic insert 10 with the throttle valve 1 and the cross section according to section A-A schematically and in simplified form. The peripheral projection 13 of the plastic insert 10 in this case does not continuously have the same spacing from the edges of the plastic insert 10. The maximum angle α between the perpendicular to the longitudinal axis of the throttle valve connector 2 (not illustrated) and the direct connection between two directly opposite regions 17, 18 of the peripheral projection 13 lies between 7° and 8°.

This generally corresponds to the desired inclination of the throttle valve 1 in the throttle valve connector. It is particularly advantageously possible to dispense with the formation of the plastic insert 10 if the throttle valve connector (not illustrated) is fabricated from the first plastic and has a peripheral projection 13 in an appropriate way.

The invention claimed is:

1. A method for production of a throttle valve in a continuous throttle valve connector comprising the steps of:

machining a peripheral, annular groove into the throttle valve connector;

introducing a first die and a second die into the throttle valve connector from both sides, wherein the first die and second die are complementary to each other and, when introduced, form in the region of the annular groove a cylindrical first cavity which, toward a center of the throttle valve connector has a peripheral projection;

putting a molten first plastic into the first cavity laterally through at least one of two apertures in the throttle valve connector and curing the first plastic there thereby forming a plastic insert having a peripheral projection;

removing the first die and the second die from the throttle valve connector;

introducing via the two apertures a throttle valve shaft through the throttle valve connector and the plastic insert at right angles to a longitudinal axis of the throttle valve connector;

mounting in the two apertures a first hollow plug and a second hollow plug such that the apertures in the throttle valve connector are closed in a manner complementary to the plastic insert;

from both sides, introducing a third die and a fourth die into the throttle valve connector which, between the two of them and the peripheral projection of the plastic insert that is formed and runs toward the center of the throttle valve connector, form a second cavity which surrounds the throttle valve shaft in the form of the throttle valve;

putting a molten second plastic into the second cavity through the third die and curing the second plastic there so as to form the throttle valve; and removing the third die and the fourth die from the throttle valve connector.

2. The method according to claim 1, wherein the first plastic and the second plastic used comprise polyphenyl sulfide with different linear coefficients of expansion.

3. The method according to claim 2, wherein the first plastic is a polyphenyl sulfide with a linear coefficient of expansion between 90° C. and 250° C. of $36 \cdot 10^{-6}$ and the second plastic is a polyphenyl sulfide with a linear coefficient of expansion between 90° C. and 250° C. of $46 \cdot 10^{-6}$.

4. The method according to claim 1, further comprising the step of introducing a throttle valve shaft in a region of the throttle valve, the shaft comprising machined portions for form-fitting fixing of the second plastic.

5. The method according to claim 4, wherein the machined portions are holes.

6. The method according to claim 1, wherein the peripheral projection of the plastic insert is not formed continuously at the same spacing from edges of the plastic insert, and a maximum angle α between the perpendicular to the longitudinal axis of the throttle valve connector and the direct connection between two directly mutually opposite regions of the peripheral projection lies between 7° and 8°.

7. The method according to claim 1, further comprising the step of introducing a throttle valve shaft comprising a tapered cross section near the throttle valve.

* * * * *